United States Patent Office 3,206,412
Patented Sept. 14, 1965

3,206,412
RESOLVING WATER-IN-OIL EMULSIONS WITH POLYOXYALKYLATED CONDENSATION POLYMERS OF ALKYL PHENOLS, FORMALDEHYDE, AND ALKYLOL PRIMARY MONOAMINES
Willard H. Kirkpatrick, Sugar Land, and Virgil L. Seale, Houston, Tex., assignors to Nalco Chemical Company, a corporation of Delaware
No Drawing. Filed July 3, 1961, Ser. No. 121,374
5 Claims. (Cl. 252—344)

This invention relates to new and useful chemical compositions having surface-active properties and capable of lowering the interfacial tension between water and oil, especially in water-in-oil emulsions. The invention relates particularly to the treatment of emulsions of mineral oil and water, such as petroleum emulsions commonly encountered in the production, handling and refining of crude mineral oil, for the purpose of separating the oil from the water. Also, the invention relates to the treatment of other water-in-oil type of emulsions wherein the emulsions are produced artifically or naturally and the resolution of the emulsions presents a problem of recovery or disposal. An aspect of the invention is concerned with the employment of the compositions of the invention in desalting.

Petroleum emulsions are, in general, of the water-in-oil type wherein the oil acts as a continuous phase for the dispersal of finely-divided particles of naturally occurring waters or brines. These emulsions are often extremely stable and will not resolve on long standing. It is to be understood that water-in-oil emulsions may occur artifically resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a deemulsifying agent of the kind hereinafter described, thereby causing the emulsion to resolve and stratify into its component parts of oil and water or brine after the emulsion has been allowed to stand in a relatively quiescent state.

Still another type of process involves the use of a deemulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A deemulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

In desalting operations where petroleum emulsions are created artificially and then broken, the conditions employed are usually quite different from those used in breaking water-in-oil petroleum emulsions at the well. The temperature may range from 160° F. to 350° F. and are preferably around 190° F. to 210° F. The pressures are those which are developed by heating under autogenous pressures and may be, for example, 215 to 250 pounds per square inch gauge. The time of heating is subject to variation but is usually around 15 to 30 minutes. Since a refinery unit may handle up to 50,000 barrels of oil per day and the amount of salt present may be, for example, 15 pounds to 250 pounds of salt per thousand barrels of oil, it will be appreciated that the separation of this salt is very important, especially since it is usually desired to reduce the salt content of the oil by at least 90%.

One of the objects of the present invention is to provide new and useful compositions of matter which are water-wettable, interfacial and surface-active in order to enable their use as deemulsifiers or for such uses where surface-active characteristics are necessary or desirable.

A further object of the invention is to provide a new and improved process for resolving water-in-petroleum oil emulsions into their component parts of oil and water or brine.

In accordance with the invention, the surface-active agents are polyoxyalkylated condensation polymers, the polycondensation polymers being obtained by reacting phenols which are primarily difunctional alkyl phenols, the alkyl groups having an average of 4–15 carbons, formaldehyde, and alkylol, primary monoamines. Ortho, ortho- or para, ortho-dialkyl phenols are not suitable for compositions of this invention, but amounts up to 25% of said dialkyl phenols in the difunctional, alkyl phenol reactant may be tolerated. Dialkyl phenols with one alkyl group in the ortho- or para-position and one alkyl group in the meta-position are difunctional phenols for the purposes of this invention. The term "difunctional phenol" relates to the methylol-forming reactivity of the phenol with formaldehyde.

The preferred phenols used in the condensate polymers are monoalkyl phenols having the alkyl group in the functional positions of the phenolic ring upon which methylol groups form in the reaction with formaldehyde, i.e., the ortho- or para-positions. The alkyl groups in the phenolic substituent may be the same or they may be different, as when a mixture of alkyl phenols is the phenolic reactant. The average number of carbons in the alkyl groups of the phenolic reactant should be in the range of about 4–15. Alkyl groups of 4–9 carbons are preferred.

Examples of such phenols are o-butyl phenol, o-isobutyl phenol, p-n-butyl phenol, p-isobutyl phenol, p-tert. butyl phenol, o-amyl phenol, p-amyl phenol, p-tert. amyl phenol, o-octyl phenol, p-octyl phenol, o-nonyl phenol, p-nonyl phenol, o-dodecyl phenol, p-dodecyl phenol, mixtures of o-phenols and p-alkyl phenols, mixtures of ortho or para alkyl phenols with up to 25% o-, p-dialkyl phenols with 4–15 carbons in the alkyl groups such as the commercially available mixture of about 90% p-nonyl phenol with about 10% o-, p-dinonyl phenol, and mixtures of difunctional monoalkyl phenols whose alkyl groups average at least about 4 carbons and not more than about 15 carbons, e.g., mixtures of p-octyl phenol and p-nonyl phenol, a mixture of about 30% p-isopropyl phenol and 70% p-octyl phenol, and the like.

The alkylol, primary monoamines have a single alkylol group attached to the amine group. The alkylol group may have either one or two hydroxy groups. The alkylol groups will contain 2–5 carbons. Exemplary monoalkylol primary amines include ethanol amine, propanol amine (3-aminopropanol-1), 1-aminobutanol-3, 1-aminobutanol-4, 2-amino-2-methyl-propanol - 1, 2 - amino-2 - methyl - propane diol - 1,3, 2 - amino - 2 - ethyl-propane diol-1,3, mixtures thereof and the like. The phenol and alkylol amine nuclei in the condensation polymer connected by methylene bridges supplied by formaldehyde or a substance which breaks down into formaldehyde under reaction conditions, e.g., paraformaldehyde or trioxane.

The oxyalkyating agents are lower alkylene oxides, e.g., ethylene oxide, 1,2-propylene oxide, 1,2-butylene oxide, 2,3-butylene oxide or mixtures of the aforesaid oxides in any desired ratio. The weight ratio of the alkylene oxide adducted on the phenol-formaldehyde-alkylol amine condensation polymers will, for most applications, fall between about 2:3 and 15:1, respectively. The phenol-formaldehyde-alkylol amine condensation products contain about 4–15 phenolic nuclei per resin molecule.

Where two different oxides are used to oxyalkylate, they may be reacted as a mixture or they may be added sequentially. For example, in oxyalkylating with both of ethylene oxide and either propylene oxide or butylene oxide, the propylene oxide or butylene oxide may be added to the resin first and the ethylene oxide is then reacted so that it forms an oxyethylene adduct on the oxypropylene or oxybutylene groups, or vice versa. In the former case, the terminal oxyalkylene groups are those of oxyethylene, which have terminal hydroxyl groups. The other oxides give secondary hydroxyl groups. Simultaneous reaction of a mixture of the oxides, one of which is ethylene oxide, probably gives an oxyalkylated product having both terminal primary hydroxy groups and terminal secondary hydroxy groups.

PHENOL-FORMALDEHYDE-ALKYLOLAMINE CONDENSATION POLYMERS

The phenol-formaldehyde-alkylolamine condensation products are prepared by reacting formaldehyde or a substance which breaks down to formaldehyde under reaction conditions, e.g., paraformaldehyde or trioxane, the difunctional alkyl phenol, often preferably a crude mixture of alkylated phenols for economic reasons, and the alkylolamine by heating the reactants in the presence of a small amount of an alkaline catalyst such as sodium hydroxide under the reaction temperatures and conditions causing the elimination of water of reaction. The condensates are phenolic and alkylolamine residues connected by methylene bridges. In some cases, the alkylolamine itself serves as the alkaline catalyst.

The condensation reaction preferably is carried out under substantially anhydrous conditions—excepting the water produced during the reaction. The aqueous distillate which begins to form when the reactants are heated is collected and removed from the reaction mixture.

The phenol-formaldehyde-alkylolamine condensation product may be prepared by agitating and heating a mixture of the three reactants. In this case, the presence of the alkylolamine provides sufficient alkalinity for the condensation reaction. Alternatively, the alkyl phenol and formaldehyde may be only partially condensed—e.g., by heating these reactants above for a shorter period of time than necessary to obtain complete condensation and leaving in the reaction mixture some unreacted phenol and formaldehyde. The reaction mixture is then cooled somewhat, and the alkylolamine is added to the reaction mixture. Heat is again applied to remove the water of reaction. Heating is continued until the amount of aqueous distillate collected indicates that the condensation is complete. Alternatively, the alkyl phenol may be precondensed with a portion of the formaldehyde in the form of precursor phenol-formaldehyde intermediate condensate. The intermediate condensate is thereafter further condensed by reacting it with the remainder of the formaldehyde and the alkylolamine thereafter added to the precursor condensate.

This aspect of the invention is illustrated in the following examples, but is not limited thereto. The parts are by weight.

Example I

In a three-necked reaction flask provided with means of mechanical stirring and a return condenser system permitting the removal of any aqueous phase formed in the course of the reaction, there is added 750 parts of a crude alkylate phenol which comprises an undistilled p-nonylphenol containing approximately 10% of o-p-dinonyl phenol, 175 parts of paraformaldehyde and 2 parts of finely divided sodium hydroxide which is present as a catalyst in the reaction. These materials are heated to 60° C., and at this point the source of heat is removed. The temperature rises slowly to approximately 110° C., at which point it is held for two hours. At this point 250 parts of a suitable hydrocarbon extract is added, and heat is applied to remove 60 parts of aqueous distillate at a maximum temperature of 150° C. The reaction mass is cooled to 110° C. and at this point is added 60 parts monoethanolamine. Heat is again applied to remove 45 parts of aqueous distillate with a maximum final temperature of 210° C. At this point the material is cooled to 175° C. and 250 parts of a suitable hydrocarbon extract is added to give the finished phenol-formaldehyde-monoethanolamine resin.

Example II

In a manner similar to Example I, 750 parts of the same crude alkylate phenol, 180 parts paraformaldehyde and 2 parts sodium hydroxide were heated for 2 hours at a temperature in the range of 100–110° C. After this period of heating, 250 parts of a suitable hydrocarbon extract, and 60 parts of monoethanolamine were added. The material was again heated to remove 102 parts of aqueous distillate with a maximum final temperature of 210° C. The material was cooled to 175° C. and 250 parts of a suitable hydrocarbon extract were added to give the finished resin.

Example III

In a three-necked reaction flask provided with means of mechanical stirring and a return condenser system permitting the removal of any aqueous phase formed in the course of reaction, there is added 720 parts of the crude alkylate phenol, as described in Example I, and 163 parts of monoethanolamine. These materials are heated together to approximately 60° C. at which point the addition of paraformaldehyde is begun. Then 178 parts paraformaldehyde are added slowly and in portions in such manner to maintain the temperature of the reaction mass below 90° C. After the addition of the paraformaldehyde has been completed, the reaction mass is held at 90–95° C. for 1 hour. Then 200 parts of a suitable hydrocarbon fraction are added and the temperature raised to remove aqueous distillate in the amount of 110 parts with a maximum final temperature of 203° C. This gives the finished phenol-formaldehyde-ethanolamine resin.

The ratio of ethanolamine to phenol in the above example is calculated to give about one basic nitrogen per mole of phenol. It should be further noted in this example that the ethanolamine operates as a reactive catalyst, or in other words, no sodium hydroxide or other alkaline material is used as a catalyst.

Example IV

In a manner similar to Example III, 720 parts of the crude alkylate phenol and 163 parts of monoethanolamine are reacted with 178 parts of paraformaldehyde. After the addition of the paraformaldehyde is completed, the reaction mass is held at 90–95° C. for 1 hour. Then 200 parts of a suitable hydrocarbon extract are added and the temperature raised to remove 110 parts of aqueous distillate with a maximum final temperature of 190° C. This gives the finished resin.

Example V

In a three-necked reaction flask provided with means of mechanical stirring and a return condenser system permitting the removal of any aqueous phase formed in the course of reaction, there is added 305 parts of the monoethanolamine and 330 parts of paraformaldehyde in such a manner as not to allow the temperature of 80–95° C. for 1 hour.

In a reaction system as described above there is added 381 parts of the above described intermediate and 720 parts of the crude alkylate phenol, as described in Example I. The materials are heated together at approximately 90° C. for 1 hour at which point 200 parts of a suitable hydrocarbon extract is added. The temperature is again raised to remove 120 parts of aqueous distillate with a maximum final temperature of 217° C. At this point, 300 parts of a suitable hydrocarbon extract are added to give the finished resin.

The mol ratio of the phenol to the alkylol primary amine in the foregoing examples was about 1:1, a preferred ratio for purposes of the invention. The same procedures can be used however, to prepare condensation polymers at other mol ratios, e.g., 2:1, 5:1, 8:1, etc.

*Example VI*

In a three-necked reaction flask provided with means of mechanical stirring and a return condenser system permitting the removal of any aqueous phase formed in the course of reaction, there is added 720 parts of the crude alkylate phenol, as described in Example I, and 150 parts of 3-aminopropanol-1. These materials are heated together to approximately 60° C. at which point the addition of paraformaldehyde is begun. Then 178 parts paraformaldehyde are added slowly and in portions in such manner to maintain the temperature of the reaction mass below 90° C. After the addition of the paraformaldehyde has been completed, the reaction mass is held at 90–95° C. for 1 hour. Then 200 parts of a suitable hydrocarbon fraction are added and the temperature raised to remove aqueous distillate in the amount of 110 parts with a maximum final temperature of 203° C. This gives the finished phenol-formaldehyde-propanolamine resin.

*Example VII*

In a manner similar to Example III, about equal mols p-butyl phenol and monoethanolamine are reacted with a number of mols of paraformaldehyde equivalent to an amount of formaldehyde about double the mols of the p-butyl phenol.

The ratio of ethanolamine to phenol in the above example is calculated to give about one basic nitrogen per mol of phenol. It should be further noted in this example that the ethanolamine operates as a reactive catalyst, or in other words, no sodium hydroxide or other alkaline material is used as a catalyst.

The ethanolamine serves as a linking radical in the polymer chain, connected at two amino nitrogens by a methylene group, supplied by the formaldehyde, to the phenolic nuclei and possibly partly to other ethanolamine groups.

The ratio of the phenol to the alkylolamine in the polymer condensate ranges from about 1:1 to about 10:1, respectively, and the molar quantity of the reacted aldehyde is in the range of about 0.9 to about 1.5 times the total reacted mols of the phenol and the alkylolamine. At least some phenol and alkylolamine residue in all of the various types of condensate will be linked by the characteristic group,

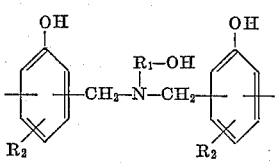

wherein $R_2$ is the alkyl group in the o- or p-position, the methylene bridge is in the o- or p-position, and $R_1$ is the remainder of the alkylolamine residue. Some of the polymeric condensates will have at least one of the following linking groups

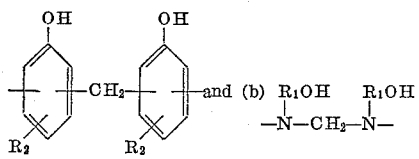

wherein the methylene bridge in (a) and $R_1$ and $R_2$ are as above-described. In all of the condensates, at least a portion of the ethanolamine residues are chemically combined internally in the structure of the phenol-formaldehyde ethanolamine resins.

OXYALKYLATION OF THE CONDENSATION PRODUCTS

Having prepared the intermediate phenol-formaldehyde ethanolamine condensation products, the next step is the oxyalkylation of the condensation product. This is achieved by mixing the intermediate alkyl phenol-formaldehyde-alkylolamine condensation product in a hydrocarbon solvent with a small amount of sodium or potassium hydroxide in an autoclave. The condensation product is heated above 100° C. and preferably not over 180° C., and the alkylene oxide is charged into the autoclave until the pressure is in the vicinity of 75 to 100 p.s.i.

The reaction mixture is gradually heated until an exothermic reaction begins. The external heating is then removed, and alkylene oxide is added at such a rate that the temperature is maintained between about 150–160° C. in a pressure range of 80 to 100 p.s.i. After all of the alkylene oxide has been added, the temperature is maintained for an additional 1 to 2 hours to assure substantially complete reaction of the alkylene oxide. The resulting product is the alkylene oxide adduct of an alkyl phenol-formaldehyde ethanolamine condensation product, in which the weight ratio of the oxide to the condensation product is between 2:3 and 15:1, respectively.

Some preferred embodiments of the oxyalkylated, alkyl phenol-formaldehyde-alkylolamine condensation products and methods of preparation are illustrated in the following examples wherein all parts are by weight unless otherwise stated, but the invention is not limited thereto.

*Example VIII*

In an autoclave having a nominal capacity of 5 gallons, equipped with a means of external heating, cooling and mechanical agitation, there is charged 15 parts of the resin of Example III. Into a transfer bomb there is charged 25 parts ethylene oxide. The reactants are heated to 145° C., and the ethylene oxide is added until the reactor pressure is 30 p.s.i. The reaction mixture is gradually heated until an exothermic reaction begins to take place. The external heating is then removed, and ethylene oxide is added at such a rate that the temperature is maintained between 150–160° C. with a pressure range of 80 to 100 p.s.i. After approximately two hours, 15 parts of ethylene oxide has been added to the autoclave, and the temperature is maintained for an additional 30 minutes to make sure that the unreacted oxide is reduced to a minimum. The resulting product is the ethylene oxide adduct of a phenol-formaldehyde ethanolamine resin in which the ratio of oxide to resin by weight is about 1 to 1.

*Example IX*

In a manner similar to Example VIII, a series of mixed oxide adducts were prepared in which the ratio of ethylene oxide to propylene oxide was 1:1. The mixed oxides were reacted step-wise, and samples were removed from the autoclave when the product consisted of 1 part resin to 1 part mixed oxide. By a similar procedure samples were obtained from this run which consisted of 1 part of resin to 2 parts mixed oxide, 1 part resin per 4 parts mixed oxide and 1 part resin per 6 parts mixed oxide. The final product was the material in which the ratio of mixed oxides to resin was 6:1.

Example X

In a manner similar to Example IX, a series of mixed oxide derivatives were prepared using a mixture of oxides consisting of 2 parts propylene oxide to 1 part ethylene oxide. Samples were taken when the ratio of resin to mixed oxide was 1:1, 1:2, 1:4, and 1:6. The final product was the one in which the ratio of resin to mixed oxide was 1:6.

Example XI

In a manner similar to Example IX, a series of mixed oxide adducts were prepared wherein the oxide mixture consisted of 4 parts propylene oxide to 1 part ethylene oxide. Samples were taken from the reactor when the product consisted of 1 part resin per 1 part mixed oxide, 1 part resin to 2 parts mixed oxide, 1 part resin to 4 parts mixed oxide—and the final product consisted of 1 part resin to 6 parts mixed oxide.

Example XII

In a manner similar to Example VIII, a series of propylene oxide adducts of the resin of Example III was prepared. In this case the reaction of propylene oxide temperatures used ranged form 120–150° C. Samples of the propylene oxide adduct were removed from the reactor when the product consisted of 1 part resin per .7 part propylene oxide and a second sample was obtained when the product consisted of 1 part resin to 2 parts propylene oxide.

Example XIII 32.2 pounds of the final product from Example XII were charged into a 5 gallon oxyalkylation unit as described in Example VIII and to this material was added ethylene oxide so as to obtain a series of sequential ethylene oxide adducts of the propylene oxide adduct. Samples were taken when the product contained 10%, 20% and 30% by weight ethylene oxide.

Example XIV

In a manner similar to Example XII, a propylene oxide adduct of the resin of Example III was prepared. The ratio of resin to propylene oxide in this case is 1 part resin to 6 parts propylene oxide.

Example XV

In a manner similar to Example XIII, 32.6 pounds of the final product of Example XIV were charged to a 5 gallon autoclave and a series of sequential ethylene oxide adducts were prepared, and samples were taken when the product contained 10% ethylene oxide, 20% ethylene oxide, and 30% by weight ethylene oxide.

The oxyalkylated phenol-formaldehyde-alkylolamine resins of the foregoing examples can be made into finished products suitable for use as emulsion-breaking chemicals by blending the resins with the desired quantity of a suitable hydrocarbon vehicle.

Among the suitable hydrocarbons which can be employed as diluents or as solvents for the reactions preceding is sulfur dioxide extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains and is designated in the trade as sulfur dioxide extract or $SO_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The polyoxyalkylated condensation polymers of the invention consist primarily of the recurring units of the formulae (A)

and (B)
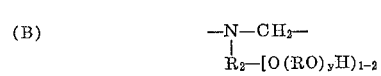

wherein the left hand valence of each of units (A) and (B) is connected to a methylene bridge, R is an alkylene group consisting of

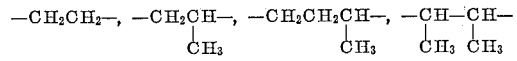

and combinations thereof, $R_1$ is selected from the group consisting of an alkyl group having 4–15 carbons and combinations of alkyl groups having an average of 4–15 carbons, $R_1$ is in one of the positions ortho and para with reference to the group $-O(RO)_xH$, $R_2$ is an alkylene group of 2–5 carbons, $x$ and $y$ are integers sufficient to make the weight ratio of the total weight of groups $-(RO)_xH$ and $-(RO)_yH$ to the total weight of the remaining parts of the condensation polymer fall within the range of 2:3 to 15:1, respectively, and the mol ratio of recurring unit (A) to recurring unit (B) is within the range of 1:1 to 10:1, respectively.

The methylene bridges usually are connected to the phenolic ring in the ortho or para positions. The terminal units of each polymer molecule will have the unsatisfied valence of the above-designated formulae as a hydrogen atom or methylol.

To exemplify further, where the phenol employed is p-nonylphenol and the alkylolamine is ethanolamine, the polyoxyalkylated condensation polymer will contain the recurring units of the formulae (A)
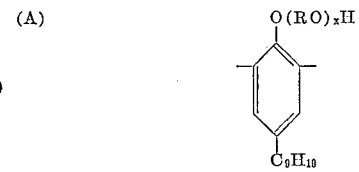

and (B)
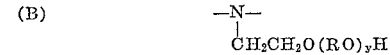

wherein the unsatisfied valence of each of units (A) and (B) is connected to a methylene bridge, R is an alkylene group consisting of

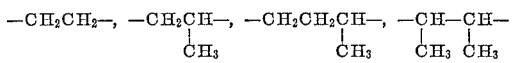

and combinations thereof, $x$ and $y$ are integers sufficient to make the weight ratio of the total weight of groups $-(RO)_xH$ and $-(RO)_yH$ to the total weight of the remaining parts of the condensation polymer fall within the range of 2:3 to 15:1, respectively, and the mol ratio of recurring unit (A) to recurring unit (B) is within the range of 1:1 to 10:1, respectively.

Where the alkyl phenol contains a small fraction of a dialkyl phenol, e.g., a mixture of about 90% p-nonyl phenol and 10%, o, p-dinonyl phenol, the recurring units of the polymer will also include a small fraction of the total recurring units in the polymer the unit

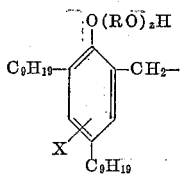

wherein z is an integer sufficient along with x and y to make the weight ratio of the total weight of the groups —$(RO)_xH$, —$(RO)_yH$ and —$(RO)_zH$ to the total weight of the other parts of the condensation polymer fall within the range of 2:3 to 15:1, respectively, and X is selected from the group consisting of —$CH_2$— and —H. It is most probable that the dialkyl phenol unit will be a terminal unit because it has only one ortho position available for reaction with the formaldehyde. It is conceivable, however, that some reaction of the formaldehyde could occur at one of the meta positions to provide a methylene bridge as heretofore indicated for the group X.

The condensation polymer of the invention may be substantially linear polymer or cross-linked polymer depending largely upon the mol ratio of formaldehyde reacted with the alkyl phenol and monoalkylolamine. Where the amount of reacted formaldehyde is in the order of about 1±0.1 mol of formaldehyde per the total mols of the alkyl phenol and monalkylolamine, the product will be substantially linear polymer molecules. As the amount of reacted formaldehyde increases above this figure to a maximum of about 1.5 mols of reacted formaldehyde for each of the total mols of the alkyl phenol and the monoalkylolamine, a portion of the units in different polymer molecules will be connected by methylene bridges to provide a cross-linked polymer.

DEEMULSIFICATION OF WATER-IN-OIL EMULSIONS

The compositions of this invention are surface-active and are particularly suitable for the deemulsification of naturally-occurring crude oil emulsions and artificial emulsions resulting from the aforedescribed processes. Deemulsification is achieved by mixing the deemulsifying agents of this invention, at a ratio in the approximate range of one part of the deemulsifying agent to 2,000–50,000 parts of the emulsion, and thereafter allowing the emulsion to remain in a relatively quiescent state during which separation of the oil and water occurs. With naturally-occurring emulsions, the temperature of the emulsion may be 50–210° F., although temperatures of at least 120° F. are often preferred to accelerate separation of the deemulsified water and oil phases. The deemulsifying agents of this invention may be used in conjunction with other deemulsifying agents from classes such as the petroleum sulfonate type, the naphthalene sulfonic acid type, the modified fatty acid type, the amine modified oxyalkylated phenol-formaldehyde type, and others.

The invention is hereby claimed as follows:

1. A process for resolving water-in-petroleum oil emulsions which comprises adding to the water-in-petroleum oil emulsion a small quantity of a polyalkylated condensation polymer which consists primarily of the recurring units of the formulae (A)
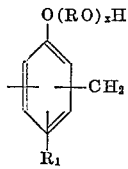

and (B)
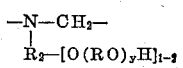
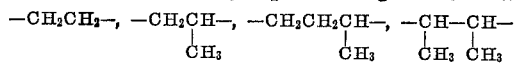

wherein the left hand valence of each of units (A) and (B) is connected to a methylene bridge, R is an alkylene group selected from the group consisting of —$CH_2CH_2$—, —$CH_2CH$—, —$CH_2CH_2CH_2$—, —$CH$—$CH$—
                 |                              |              |     |
                $CH_3$                       $CH_3$      $CH_3$ $CH_3$ and combinations thereof, $R_1$ is selected from the group consisting of an alkyl group having 4–15 carbons and combinations of alkyl groups having an average of 4–15 carbons, $R_1$ is in one of the positions ortho and para with reference to the group —$O(RO)_xH$, $R_2$ is an alkylene group of 2–5 carbons, x and y are integers sufficient to make the weight ratio of the total weight of groups —$(RO)_xH$ and —$(RO)_yH$ to the total weight of the remaining parts of the condensation polymer fall within the range of 2:3 to 15:1, respectively, and the mol ratio of recurring unit (A) to recurring unit (B) is within the range of 1:1 to 10:1, respectively, to break the emulsion into oil and water phases, said condensation polymer containing about 4–15 phenolic nuclei per molecule, and said condensation polymer being formed prior to polyoxyalkylation thereof by the polycondensation of an alkyl phenol of the formula

wherein $R_1$ is as aforedefined and is in one of the positions ortho and para to the —OH group, formaldehyde, and an alkylol primary monoamine of the formula $H_2N$—$R_2$—$(OH)_{1-2}$ wherein $R_2$ is as aforedefined, at a molar ratio of said alkyl phenol to said alkylol primary monoamine of about 1:1 to 10:1, respectively, and a molar equivalent of said formaldehyde in the range of about 0.9 to about 1.5 times the total mols of said alkyl phenol and said alkylol primary monoamine.

2. A process for resolving water-in-petroleum oil emulsions which comprises adding to the water-in-petroleum oil emulsion a small quantity of a polyoxyalkylated condensation polymer which consists primarily of the recurring units of the formulae A)
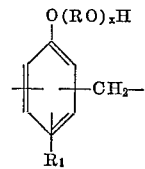

and (B)
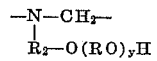
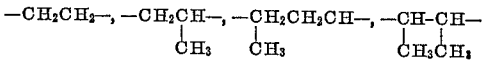

wherein the left hand valence of each of units (A) and (B) is connected to a methylene bridge, R is an alkylene group selected from the group consisting of —$CH_2CH_2$—, —$CH_2CH$—, —$CH_2CH_2CH$—, —$CH$-$CH$—
                 |                              |              |    |
                $CH_3$                       $CH_3$      $CH_3$$CH_3$ and combinations thereof, $R_1$ is selected from the group consisting of an alkyl group having 4–15 carbons and combinations of alkyl groups having an average of 4–15 carbons, $R_1$ is in one of the positions ortho and para with reference to the group —$O(RO)_xH$, $R_2$ is an alkylene group of 2–5 carbons, x and y integers sufficient to make the weight ratio of the total weight of groups —$(RO)_xH$ and —$(RO)_yH$ to the total weight of the remaining parts of the condensation polymer fall within the range of 2:3 to 15:1, respectively, and the mol ratio of recurring unit (A) to recurring unit (B) is within the range of 1:1 to 10:1, respectively to break the emulsion into oil and water phases, said condensation polymer containing about 4–15 phenolic nuclei per molecule, and said condensation polymer being formed prior to polyoxyalkylation thereof by the polycondensation of an alkyl phenol of the formula

wherein $R_1$ is as aforedefined and is in one of the positions ortho and para to the —OH group, formaldehyde, and an alkylol primary monoamine of the formula $H_2N$—$R_2$—$(OH)_{1-2}$, wherein $R_2$ is as aforedefined, at a molar ratio of said alkyl phenol to said alkylol primary monoamine of about 1:1 to 10:1, respectively, and a molar equivalent of said formaldehyde in the range of about 0.9 to about 1.5 times the total mols of said alkyl phenol and said alkylol primary monoamine.

3. The process of claim 2 wherein R is —$CH_2CH_2$—.

4. The process of claim 2 wherein R is

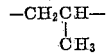

5. A process for resolving water-in-petroleum oil emulsions which comprises adding to the water-in-petroleum oil emulsion a small quantity of a polyoxyalkylated condensation polymer which consists primarily of the recurring units of the formulae (A)

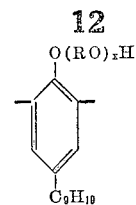

and (B) 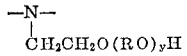

wherein the unsatisfied valence of each of units (A) and (B) is connected to a methylene bridge, R is an alkylene group selected from the group consisting of

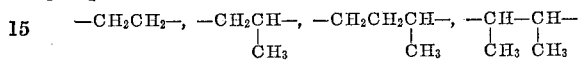

and combinations thereof, $x$ and $y$ are integers sufficient to make the weight ratio of the total weight of groups —$(RO)_xH$ and —$(RO)_yH$ to the total weight of the remaining parts of the condensation polymer fall within the range of 2:3 to 15:1, respectively, and the mol ratio of recurring unit (A) to recurring unit (B) is within the range of 1:1 to 10:1, respectively, to break the emulsion into oil and water phases, said condensation polymer containing about 4–15 phenolic nuclei per molecule, and said condensation polymer being formed prior to polyoxyalkylation thereof by the condensation of p-nonyl phenol, formaldehyde, and ethanol amine at a molar ratio of nonyl phenol to said ethanol amine of about 1:1 to 10:1, respectively, and a molar equivalent of said formaldehyde in the range of about 0.9 to about 1.5 times the total mols of said nonyl phenol and said ethanol amine.

References Cited by the Examiner

UNITED STATES PATENTS

| | | | |
|---|---|---|---|
| 2,454,541 | 11/48 | Bock et al. | 260—53 |
| 2,695,888 | 11/54 | De Groote | 252—344 |
| 2,792,365 | 5/57 | De Groote | 252—344 |
| 2,819,226 | 1/58 | De Groote | 252—344 |
| 2,839,497 | 6/58 | De Groote | 260—53 |
| 2,854,416 | 9/58 | De Groote | 252—344 |

JULIUS GREENWALD, *Primary Examiner.*

JOSEPH R. LIBERMAN, *Examiner.*